United States Patent
Yeager (10) Patent No.: US 7,316,298 B2
(45) Date of Patent: Jan. 8, 2008

(54) WHEELCHAIR SAFETY BRAKE ASSEMBLY

(75) Inventor: Arthur F. Yeager, Columbia, SC (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 241 days.

(21) Appl. No.: 11/167,931

(22) Filed: Jun. 28, 2005

(65) Prior Publication Data

US 2006/0000678 A1     Jan. 5, 2006

Related U.S. Application Data

(63) Continuation-in-part of application No. 10/425,034, filed on Apr. 29, 2003, now abandoned.

(60) Provisional application No. 60/375,815, filed on Apr. 29, 2002.

(51) Int. Cl.
*B62B 5/04*    (2006.01)

(52) U.S. Cl. .................. 188/2 F; 188/9; 188/19; 188/20; 188/17; 188/177

(58) Field of Classification Search .............. 188/9, 188/17, 18 R, 19, 20, 28, 29, 30, 31, 2 F, 188/68, 174, 177
See application file for complete search history.

(56) References Cited

U.S. PATENT DOCUMENTS

| | | | |
|---|---|---|---|
| 629,646 A * | 7/1899 | Beckstrom | .................. 188/177 |
| 4,407,616 A | 10/1983 | Hinze | |
| 4,538,825 A | 9/1985 | Delahoussaye et al. | |
| 4,589,525 A * | 5/1986 | Phipps et al. | ................ 188/2 F |
| 4,733,755 A | 3/1988 | Manning | |
| 4,887,830 A * | 12/1989 | Fought et al. | ............ 280/304.1 |
| 4,987,978 A * | 1/1991 | Jungersen | .................... 188/2 F |
| 5,199,535 A * | 4/1993 | Kaye | ........................... 188/135 |
| 5,845,746 A * | 12/1998 | Henrickson et al. | ......... 188/2 F |
| 6,102,166 A | 8/2000 | Blodee | |
| 6,464,044 B2 | 10/2002 | Suganuma | |

FOREIGN PATENT DOCUMENTS

GB     2110780     *  6/1983

* cited by examiner

*Primary Examiner*—Devon Kramer
(74) *Attorney, Agent, or Firm*—Elizabeth Arwine (57) ABSTRACT

This invention relates to gravity reactive braking systems. According to the invention there is provided a brake system to control speed in a forward direction for descending inclined surfaces and a brake system for controlling rollback when ascending an inclined surface. The speed pacer braking assembly includes a downhill activator for selectively engaging a disc brake system when a predetermined inclined is reach. The anti-rollback assembly comprises a pair of graded brake cam structures operatively disposed adjacent wheels wherein the natural pull of gravity and the configuration of the cams operate to allow passage of wheels in both directions when on flat surfaces and in only a single direction when on an incline. When on an incline, gravity operates to dispose cams relative to the wheels such that rotation of wheels in one direction is hindered by a thickening of cam body caused by rotation of cam about its axis. Both systems include adjustment means for setting the incline angle at which brake assemblies will operate to hinder wheel rotation in the undesired direction.

12 Claims, 7 Drawing Sheets

FIG. 2B
Low-High Cost Shifters

WHEELCHAIR SAFETY BRAKE ASSEMBLY

This application is a continuation-in-part of U.S. application Ser. No. 10/425,034, filed Apr. 29, 2003, now abandoned which is a nonprovisional of U.S. Provisional Application 60/375,815, filed Apr. 29, 2002. Each of these patent applications is hereby incorporated by reference.

FIELD OF THE INVENTION

The present invention relates to braking systems. More particularly, the present invention relates to safety braking systems for wheels on inclined surfaces.

BACKGROUND OF THE INVENTION

The invention of the wheel greatly revolutionized the transportation of persons and materials. As will be appreciated, wheels must have brakes or a means to cease the rotation of the wheel to stop the movement of the vehicle to which they are attached. With vehicles powered manually, such as strollers, carts, stretchers, and the like, the provision of braking mechanisms poses unique challenges. As will be appreciated, without a braking mechanism, these vehicles cannot be left unattended on slopes or non-flat surfaces in view of the fact that the force of gravity will induce the wheels (and thus the vehicle) to roll in the descending direction. This problem is a particular concern with manually or arm-powered devices, such as wheelchairs, for example, where the safety of an occupant is of utmost importance.

As will be appreciated, caregivers attending to a wheelchair occupant sometimes need to leave the occupant unattended to, for example, open a door or prepare a car lift. In these periods, the occupant may need to prevent the wheelchair from descending an incline, or from undergoing what is know in the art as a "rollback." Some occupants do not have the stamina, strength, or mental faculties to prevent a rollback on inclines.

In an effort to prevent rollbacks, some prior artisans crafted wheelchairs with wheel locks for locking the large, rear wheels against rotation. With these prior art devices, a wheel lock assembly is typically mounted to the frame of the wheelchair adjacent each rear wheel. Each wheel lock assembly includes a hand-operated lever which is connected by mechanical means to a braking member for engaging the tire tread at the periphery of the wheel. Accordingly, when the lever is disposed in a free wheeling position, the braking member is spaced away from the wheel and the tire so as to allow the wheel to rotate freely. Likewise, when the handle is moved to the locked position, the brake member is moved into contact with the tire with sufficient force so as to press into, and temporarily deform, the outer surface of the tire to frictionally hinder rotation of the tire.

One of the drawbacks with these prior art rear wheel locks is that they require either a large manual effort or a long throw to lock the wheels from further rotation. Another drawback of these prior art devices is that the braking mechanism prevents any rotation of the tires in either direction. As will be appreciated, it is desirable at times to allow the wheels to move in the ascending direction while inhibiting movement in the descending direction, such as with a patient being transported or ascending an incline. For example, if the operator were to stop propelling the wheelchair up a hill and relax, gravity would urge the chair to roll backwards. Similarly, if the occupant removed his hands from the wheels to push open a door, the pushing tends to force the wheelchair in the opposite direction. This is true even with automatic doors, wherein the occupant is forced to press against a button to actuate the door. Oftentimes, an occupant must engage the brake to prevent a rollback when pressing the open button for a door; and unfortunately, by the time the occupant disengages the brake to egress through the door, the door would close again.

Accordingly, it is desirable to provide a one-way braking mechanism to provide for rotation of the wheels in only the forward direction. In an effort to meet this need, some prior artisans crafted "hill holder" mechanisms, or one-way clutches, to attach to the hub of the rear wheels. These prior art clutches are relatively expensive and mechanically complex. Other hill holders have been devised which also incorporate a wheel lock assembly. However, these combination devices suffer from numerous drawbacks as well. For example, U.S. Pat. No. 4,887,830 to Frough et al discloses a wheelchair with a combined wheel lock and hill holder. The device uses a cam to engage the brake. However, the device is spring loaded and must thus be manually engaged and disengaged. Once engaged, the wheelchair is hindered from movement in the rearward direction completely. Furthermore, once engaged, the drag of the device on a user's forward motion remains a noted drawback.

More significantly, with these prior art wheelchairs, the braking device needs to be disengaged anytime the wheels are to be rolled in the rearward direction. The constant burden of manually engaging and disengaging a device depending on whether the occupant is on level ground or desires to move rearwardly is a significant drawback to such devices. As will be appreciated, for wheelchair occupants of limited cognitive ability, upper body strength, dexterity, range of motion, coordination, or the like, manually engaging and disengaging a safety device is not a viable option.

One particularly advantageous braking system for overcoming the problems and drawbacks associated with prior art rollback prevention systems was described by the present inventor in co-pending U.S. Ser. No. 10/425,034, filed Apr. 29, 2003, entitled "Gravity Reacting Anti-Rollback Brake." For example, as set forth in the application, a preferred embodiment of the Gravity Reacting Anti-Rollback Brake system, or "GRAB" system, comprises a pair of graded brake cam structures disposed on opposite ends of a connecting rod. The connecting rod and cams are operatively disposed adjacent the back wheels of a wheelchair via a lever assembly mount. The natural pull of gravity and the configuration of the cams operate to allow passage of wheels in both directions when on flat surfaces and in only a single direction when on an incline. Specifically, when on an incline, gravity operates to dispose cams relative to the wheels such that rotation of the wheels in one direction is hindered by a thickening of the cam body caused by rotation of the cam about its axis. The system also includes an adjustment mechanism for setting the incline angle at which the cams will operate to stop wheel rotation in the undesired direction.

While the GRAB system poses a novel and advantageous apparatus for dealing with the problem of rollback with wheelchair devices and the like, it will be appreciated that there are times when it would be advantageous for controlling the speed and movement of a wheelchair or other wheeled craft or device when descending an incline in the forward direction.

To exemplify the long-felt need in the art, consider electric wheelchairs for instance. Electric wheelchairs not only provide users with powered movement, but also provide automatic braking. Thus, electric wheelchairs inherently prevent unwanted rollback and govern forward speed on inclines or slopes regardless of the weight, strength or endurance of the user. By contrast, manually powered wheelchairs do not. Manually powered wheelchairs require a constant force grip that is affected by the weight, strength and endurance of the operator. Not all wheelchair users need the assistance of an electric wheelchair because these individuals have sufficient strength and dexterity to propel and navigate themselves. However, all wheelchair users can benefit from automatic assisted braking when descending a steep hill. Accordingly, without a braking system, manual wheelchair users attempting to navigate a hilly or steep terrain are at a disadvantage to an electric wheelchair user. Thus, paradoxically, users not requiring the assistance of an electric wheelchair find their community mobility more compromised than those in need of an electric wheelchair.

The forgoing underscores some of the problems associated with prior art braking systems. Furthermore, the foregoing highlights the long-felt, yet unresolved need in the art for a wheelchair "hybrid" to span the huge gap between manual and electric wheelchairs in regards to cost and function. Moreover, the foregoing highlights the need in the art for a braking system which automatically engages and disengages based on the user's terrain. The foregoing also highlights the need in the art for a manual wheelchair providing automatic and/or selectively automatic braking when ascending and descending graded terrain.

SUMMARY OF THE INVENTION

Various embodiments of the present invention overcome the aforementioned drawbacks in the art and offer new advantages as well. Accordingly, it is an object of the invention to provide a braking system which automatically or selectively automatically engages and disengages features based on the user's terrain. Another object of the invention is to provide an automatic or selectively automatic braking system for hindering movement in the rearward direction when ascending an incline. Another object of the invention is to provide an automatic or selectively automatic braking system which controls speed and/or movement in the forward direction when descending an incline. It is another object of the invention to provide a braking system that provides automatic braking in both the forward and rearward directions. It is a related object of the invention to provide a selectively automatic braking system wherein the braking system can be disengaged, overridden, adjusted or modified by a user.

It is also an object of the invention to provide a braking system for a wheeled craft or device, such as a wheelchair, that prevents unwanted wheelchair rollback on an up-slope and controls the forward speed on a down-slope. It is also an object of the invention to provide an improved automatic anti-rollback brake. It is a related object of the invention to provide an automatic anti-rollback brake wherein the angle of incline or grade at which the brake will be engaged is adjustable. It is also an object of the invention to provide a braking system for controlling the speed of a wheeled device or craft on a down-slope. It is a related object of the invention to provide an adjustable braking system for regulating speed wherein the angle of decline or grade at which the brake is engaged is adjustable and the force of the brake applied to the device is adjustable or variable depending on user specified or predetermined settings. It is another object of the invention to provide a braking system which can be retrofit for existing devices.

In accordance with these and other objects of the invention, there is provided a braking system for wheeled craft and devices. According to one aspect of the invention the system includes an anti-rollback brake and/or a forward moving brake, preferably both. According to another aspect of the invention, a forward moving brake is provided which comprises a speed pacer assembly. In accordance with this aspect of the invention, the speed pacer assembly is adjustable. Also in accordance with this aspect of the invention, the speed pacer assembly preferably comprises a gravity reacting automatic speed pacer, or "GRASP" assembly.

In a preferred embodiment, the gravity reacting automatic speed pacer (GRASP) assembly comprises a shifter with connecting cables operatively associated with a disc braking system and an activator. The shifter with connecting cables may comprise an off-the-shelf bike gear selector of the type used to move a gear derailer between different positions. In a presently preferred embodiment for a wheelchair, the shifter is mounted on the wheelchair frame near the user's hand and may be used to adjust the amount of braking force applied to the disc brake(s) of the disc brake system. According to this embodiment, the connecting bike cable(s) extends the shifter lever(s) movement to calipers that squeeze the disc brake(s) via brake pads or the like. Preferably, the calipers squeeze the disc brake with a predetermined force which is pre-set to correspond to the position of the shifter lever(s). In a presently preferred embodiment, the disc brake(s) comprises a disc brake of the type currently installed on some high-end mountain bikes.

In a presently preferred embodiment, the activator comprises safety bearing(s) and preferably a downhill activator. Downhill activator(s) is associated with main wheel axle(s) of a wheelchair with a pre-set braking configuration. According to this embodiment, downhill activator engages a safety bearing. According to the invention, safety bearing is configured such that the inner and outer surfaces of cooperating rings can be locked to rotate in unison by moving the inner ring (in or out) to engage locking mechanism. Preferably, safety bearing includes an internal spring that will allow inner and outer rings to automatically disengage once pressure to the inner ring is released.

In a presently preferred embodiment, the safety bearing of downhill activator is not engaged while the wheelchair is on flat ground, allowing the axle of main wheel to rotate without resistance. According to this embodiment, if a down slope is encountered, the down hill activator, which in this embodiment comprises a weighted pendulum with a cammed head, pushes against the inner ring of the safety bearing thereby overcoming the spring bias of an internal spring and causing the inner ring to ascend into and engage the outer ring. Once the inner ring is pushed sufficiently within the outer ring, the outer ring's periphery continues to rotate in a bearing housing built into the wheelchair frame. The brake calipers and pads may apply braking friction to the disc brake which is attached to the inner ring of the safety bearing. The braking force applied to disc brake is communicated to outer ring via the mechanical mating of inner and outer ring within the safety bearing by, for example, interlocking gear teeth or the like. The force of brake pads on disc brake slow the rotation of disc brake thereby resulting in a corresponding change in the speed of rotation of the axle in the bearing housing (due to the mechanical coupling of inner and outer rings). This of course results in a corresponding change in the speed of rotation of main wheel of wheelchair.

According to another aspect of the invention, an anti-rollback brake is provided which comprises a gravity reacting anti-rollback brake (GRAB). According to this aspect of the invention, the gravity reacting brake is preferably adjustable to engage at a predetermined incline. Also according to this aspect of the invention, the brake may be configured to be disengageable, overridden, or otherwise selectively automatic.

According to another aspect of the invention, the braking system comprises a brake cam. In accordance with this aspect of the invention, the brake cam is preferably graded such that it increases in gripping power as it is engaged. The grade is preferably such as to allow movement in a desired direction, and even more preferably such as to provide for disengagement when on flat surfaces to allow movement in both directions. In a preferred embodiment, the graded brake cam comprises a durable material, such as a material selected from the group consisting of metal alloys that are lightweight and strong. The brake cam also preferably utilizes interchangeable brake pads.

According to another aspect of the invention, there is provided an anti-rollback braking system for use in conjunction with a forward motion braking system of the type described above. In accordance with this aspect of the invention, the anti-rollback braking system may also be disposed on a wheeled craft or device. In a preferred embodiment, the anti-rollback braking system comprises brake cam(s) associated with main wheel axle(s) of a wheelchair. The brake cam(s) is preferably operationally associated with an axle ring of safety bearing of a forward motion braking system of the type described above. More preferably, brake cam(s) engages the axle ring of safety bearing via interlocking geared teeth.

Given the following enabling description of the drawings, the apparatus should become evident to a person of ordinary skill in the art.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE DRAWINGS

The present invention is based, in part, on the discovery that a gravity reacting braking system can prevent undesired movement of objects disposed on an incline or decline. While the present invention will be described in connection with a wheelchair, it will be readily apparent to one of ordinary skill in the art that the present invention can be applied to a multiplicity of fields and uses. In particular, the present invention may find use for preventing the movement of other manually powered vehicles such as carts, stretchers, strollers and the like. Moreover, while the embodiment depicted shows a braking system comprising both a gravity reacting anti-rollback braking system and a gravity reacting automatic speed pacer system in combination, it should be understood that the systems may be provided individually as well as together depending on the user's needs. Likewise, the systems will be understood by one of ordinary skill in the art as being easily modified to be made adjustable, capable of operator override, or otherwise selectively automatic. Finally, one of ordinary skill armed with the present specification will also understand that the present system may be easily modified to include different mechanisms, including different gravity activated or reactive mechanisms, which achieve the purposes of the braking systems of the present invention.

Figure 1A:
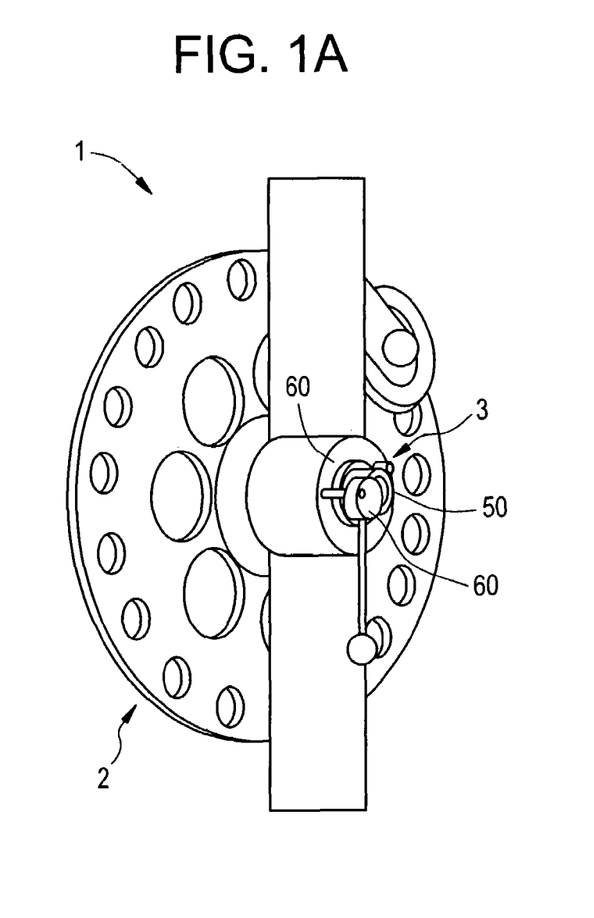
FIG. 1A is a perspective view of an embodiment of a brake assembly according to the invention.
Figure 1B:
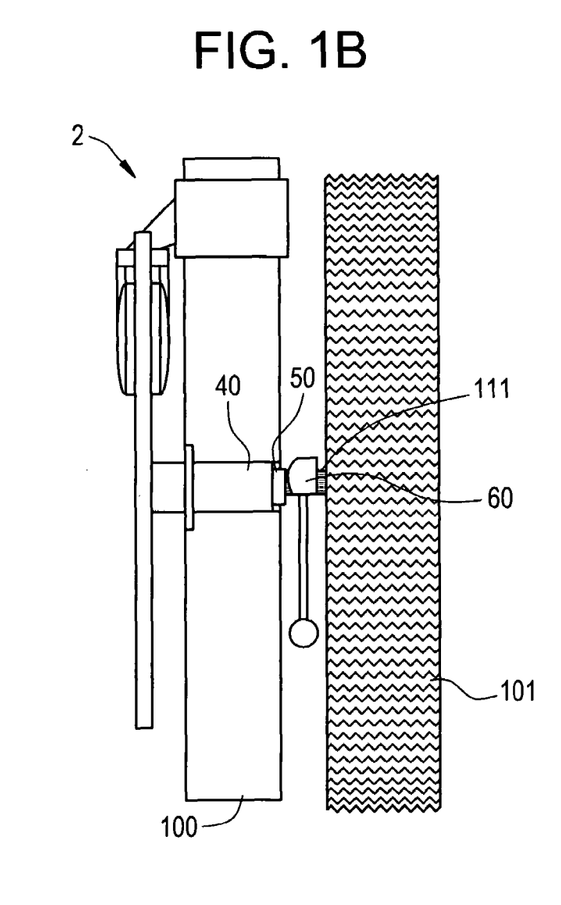
FIG. 1B is a front view of the embodiment of FIG. 1A.

FIGS. 1A and 1B depict a presently preferred embodiment of the invention. In this embodiment, gravity brake system 1 is coupled to wheelchair 100. As shown in FIG. 1A, the invention contemplates that the simple construction and configuration of brake system 1 is such that the device may be adapted to retrofit almost any existing wheelchair. As shown in FIG. 1B, the brake system may be associated with a respective axle 111 of a main wheel 101 of a wheelchair 100.

According to the presently preferred embodiment, brake system 1 preferably comprises two separate braking mechanisms: a Gravity Reacting Automatic Speed Pacer assembly (GRASP) 2 to control or hinder forward motion and speed when descending a decline, and a Gravity Reacting Anti-Rollback Brake (GRAB) 3 to hinder or prevent backward motion when ascending an incline.

Figures 2A, 2B, 2C:
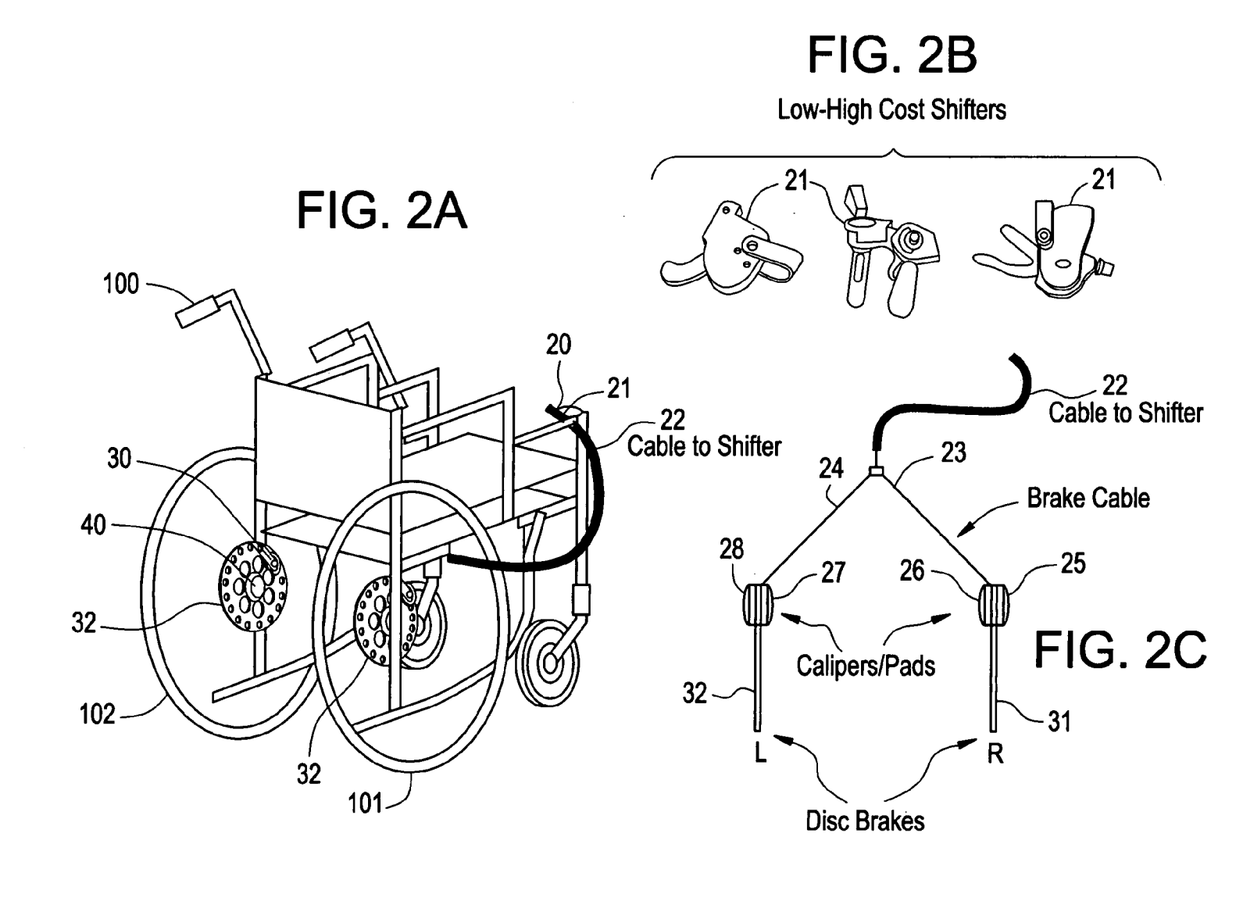
FIG. 2A is a perspective view of a wheelchair utilizing an embodiment of a brake assembly according to the invention.
FIG. 2B is a perspective view of shifters that may be used in a brake assembly according to the invention.
FIG. 2C is a plan view of a portion of a brake assembly embodiment according to the invention.

As pictured generally on FIG. 2A, the GRASP assembly comprises a controller 20 in communication with a disc braking system 30 which is operatively associated with an activator 40.

In a presently preferred embodiment, controller 20 comprises a shifter 21 with connecting cable 22. A suitable shifter 21 and connecting cable 22 for use in the present invention includes a bicycle gear selector assembly. Such off-the-shelf assemblies include a gear selecting shifter with connection cables which provide for movement of a gear derailer between different gear spindles or positions. Representative off-the-shelf assemblies adaptable for use in the present invention are depicted in FIG. 2B.

In a preferred embodiment, shifter 21 comprises an off-the-shelf bicycle shifter for a twelve-speed bike, or in other words, a shifter with twelve different settings or positions.

Preferably, shifter 21 is mounted on the wheelchair frame in an area easily accessible by a user, such as, for example, an area near the user's right hand (or left hand for a left-handed user). The location of the shifter 21 is not critical to the invention and any suitable or desired location for the provision of a shifter 21 is deemed within the scope of the invention. Preferably, as best depicted in FIG. 2C, connecting cable 22 of shifter 21 descends from shifter 21 to form a "Y" junction. A respective branch 23, 24 of the Y-split is associated with a respective main wheel 101, 102 of wheelchair 100. Alternatively, a separate shifter and associated cable for each wheel may be used. However, the use of a common shifter is preferred to help ensure uniformity of braking force on each wheel, thereby decreasing the risk of the chair pulling to the right or left and possibly tipping over.

Continuing with FIG. 2A, it will be appreciated that the shifter 21 is provided to allow for the adjustment of the amount of braking force applied to the wheelchair. According to this embodiment, the braking force applied to the chair is determined by the shifter 21 in conjunction with the disc braking system 30. In this embodiment, the position of the shifter determines the amount of braking force provided by the disc brakes on the respective wheels, wherein different positions correlate to different braking force being communicated to the disc brakes.

As better shown in FIGS. 1A and 1B, disc braking system 30 comprises a pair of disc brakes 31, 32, each one associated with a respective main wheel 101, 102 of the chair 100. Suitable disc brakes 31, 32 for use in the present invention includes those currently found on certain high-end mountain bikes. To slow or stop the rotation of the main wheels using the GRASP assembly as elaborated on herein, the rotation of the disc brakes 31, 32 must be slowed or stopped. To accomplish this, the movement of the lever of shifter 21 is communicated through connecting cable 22, through the respective legs 23, 24, to a pair of calipers 25, 26 and 27, 28 associated with each respective leg 23, 24. Thus, actuation of shifter 21 causes the left calipers 25, 26 to grasp left disc brake 31 and the right calipers 27, 28 to grasp the right disc brake 32. Again, as will be appreciated, this configuration allows for equal or bilateral brake tension to be applied to each wheel from a single controller, ensuring that the wheels receive comparable braking force, thereby hindering lateral movement, reducing the pulling of the chair to the right or left, and lowering the potential of the chair tipping over.

The use of a shifter, such as a 12-speed bike gear shifter, is advantageous due to the wide range of operator weights, slope grades, and individual comfort levels it can be modified to accommodate. Specifically, each of the shifter positions or settings affords a specific, pre-determined amount of caliper/disc friction to be applied. For example, a shifter position equivalent to "$1^{st}$ gear" on a bicycle can be set to afford little friction, thereby causing negligible or moderate slowing of the wheel rotation of the chair, while a shifter position equivalent to "$12^{th}$ gear" can be set to result in maximum friction or complete or almost complete stoppage of wheel rotation. However, one of ordinary skill in the art armed with the present application will readily appreciate that numerous other mechanisms can be incorporated into the chair instead of a bicycle gear shifter to carryout the present invention.

Furthermore, while it is within the scope of the invention to permanently couple the rotation of disc brake 31, 32 with the rotation of its respective wheel 101, 102, whereby the braking system 30 is always in operation and any braking force applied to the disc brake 31, 32 is translated to the wheel 101, 102, a particularly advantageous feature of the invention is the actuator assembly 40 which allows the braking system 2 to be automated and adjustable.

Figure 3A:
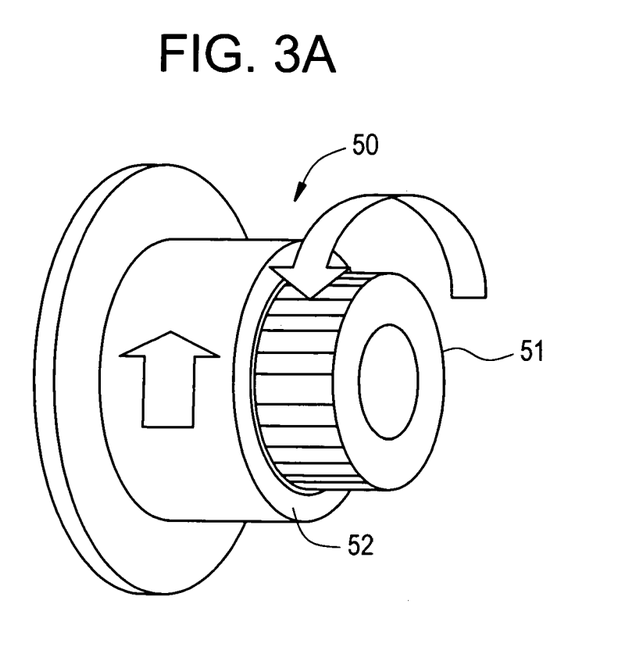
FIG. 3A is a perspective view of a safety bearing of a brake assembly embodiment according to the invention in the disengaged position.
Figure 3B:
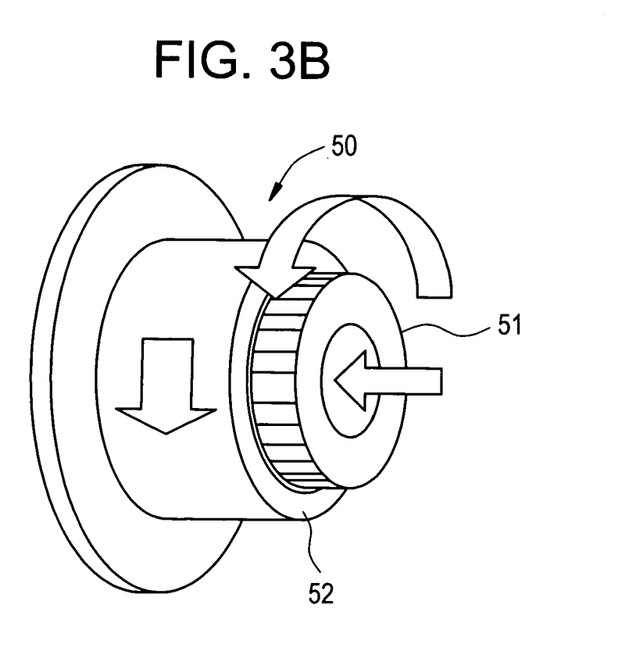
FIG. 3B is a perspective view of a safety bearing of a brake assembly embodiment according to the invention in the engaged position.

Preferably, each wheel 101, 102 of wheelchair 100 includes its own actuator assembly 40. In a preferred embodiment, each actuator assembly 40 comprises a safety bearing 50 and a downhill actuator 60. Although numerous types of locking mechanisms exist in the art that can be adapted to serve the function of a safety bearing according to the invention, a presently preferred safety bearing is shown in FIGS. 3A and 3B. As depicted, safety bearing 50 comprises an inner ring 51 and an outer ring 52. Inner ring 51 is coupled, integral, associated with, matable or connected to the axle of its respective wheel 101, 102 such that the rotation of the wheel 101, 102 results in a corresponding rotation of inner ring 51 and vice versa when in operation.

Outer ring 52 rotates in a bearing housing 53 built into the wheelchair frame 110 for its respective wheel 101, 102. The outer ring 52 is integral with or connected to its respective disc brake 31, 32. Accordingly, as will be appreciated, hinderance of the rotation of the disc brake 31, 32 results in a corresponding hinderance of rotation of outer ring 52.

Outer ring 52 includes an aperture in its interior and is sized such that its inner periphery in couplable to the outer periphery of inner ring 51. Inner ring 51 is sized and positioned such that it can be moved inside aperture of outer ring 52. Outer ring 52 includes a spring (not shown) which normally biases inner ring 51 out of aperture of outer ring 52. Inner ring 51 may be moved into aperture of outer ring 52 by overcoming the spring bias of the outer ring's internal spring.

As illustrated in FIG. 3A, when inner ring 51 is outside of aperture of outer ring 52, the inner ring rotates freely from outer ring. Conversely, as shown in FIG. 3B, when inner ring 51 is inserted into aperture, the outer periphery of inner ring 51 mates with the inner periphery of outer ring 52 via mechanical means, such as interlocking teeth or gear mesh or the like, whereby the inner ring 51 can only rotate in unison with the outer ring 52.

Figure 4A:
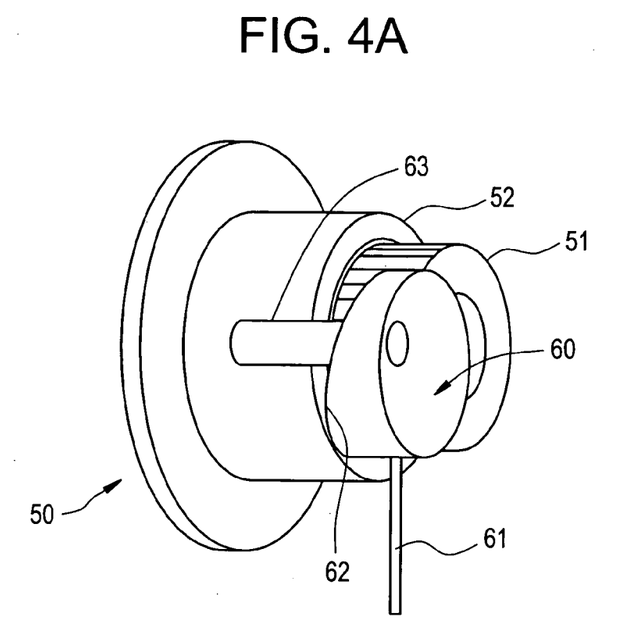
FIG. 4A is a perspective view of a down-hill activator of a brake assembly embodiment according to the invention on flat terrain.
Figure 4B:
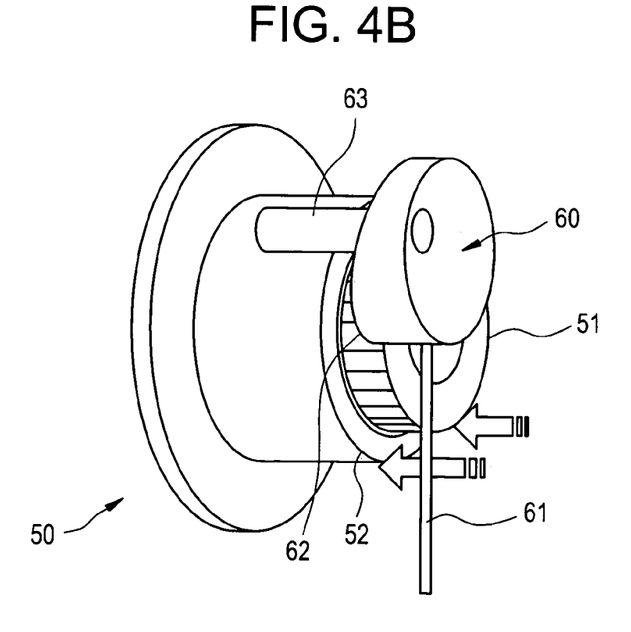
FIG. 4B is a perspective view of a down-hill activator of a brake assembly embodiment according to the invention on a downhill decline.

While it is within the scope of the invention to allow for inner ring to be manually inserted into outer ring when desired (or even permanently inserted into outer ring if desired), a particularly advantageous aspect of the invention is the provision of a downhill activator 60. According to a presently preferred embodiment, best shown in FIGS. 4A and 4B, downhill activator 60 comprises a gravity reacting activator having a weighted pendulum 61 with a cammed head 62. A connecting rod 63 is used to operatively position downhill activator 60. In a preferred embodiment, connecting rod 63 connects cammed head 62 with outer ring 52 or other suitable portion of chair 100 which allows activator 60 to maintain its gravitationally induced pendulum response to a change in the incline of chair. As will be appreciated, gravity keeps the pendulum's center of gravity at a constant 180 degrees from the fulcrum regardless of the angle of the wheelchair. As best shown in FIG. 4A, cammed head 62 is configured such that on level surfaces, the cam surface allows the inner ring 51 to rotate freely, thereby allowing freewheeling in the forward direction. However, as depicted in FIG. 4B, once a decline is encountered, the tilt of the wheelchair with respect to the constant 180° position of the pendulum 61 results in cammed head 62 contacting and camming inner ring 51 towards outer ring 52 and eventually into aperture of outer ring 52. With this configuration, the normally disengaged inner ring 51 (due to bias of internal spring or other suitable means) will become engaged when a predetermined grade of decline is encountered.

In operation, the safety bearing 50 is not engaged while the chair 100 is on flat ground. This disposition of the safety bearing allows the axle of the main wheel to rotate without resistance. If a down slope is encountered, then the pendulum 61 tilts towards the front of the chair due to the force of gravity keeping the pendulum 61 at a 180° angle from the fulcrum created by connecting rod 63. This pendulum action allows cammed head 62 to push against inner ring 51 in the direction of aperture of outer ring 52. If a sufficiently steep down slope is encountered (which is predetermined), then cammed head 62 positions inner ring 51 into cooperative engagement with outer ring 52. Once engaged, the braking friction applied to disc brakes 31, 32 will directly affect rotation of the wheels 101, 102. In essence, once activated, this configuration results in main wheel axle 111, 112 being operatively connected to the disc brake 31, 32. Accordingly, the disc braking system 30 and shifter mechanism 20 control the speed at which the wheelchair 101 descends the slope.

According to a preferred embodiment of the invention, the grade of slope at which the safety bearing 50 will be engaged may be adjusted by adjusting the position of weights in gravitational communication with the downh-hill activator.

In operation, once the decline of the slope is such that the pendulum 61 moves away from the front of the chair 100 via pendulum action, the cammed head 62 moves reciprocally therewith and reaches the point that it is no longer blocking the ascension of inner ring 51 from outer ring 52. When its path is no longer blocked by cammed head 62, the internal spring ejects inner ring 51 from outer ring 52 and the GRASP brake is deactivated to allow freewheeling in the forward direction.

The disc brake(s) 31, 32 is depicted in the figures as separate and opposite the main wheel(s) 101, 102 for purposes of illustration and ease of reference. However, although the depicted configuration is suitable for use in the present invention, a presently preferred embodiment comprises securing the disc brake to the main wheel(s) 101, 102. This configuration may provide increased stability.

It is well within the ability of one of ordinary skill in the art armed with the present specification to modify the shape, configuration or disposition of the system to achieve the intended purpose.

While the GRASP assembly 2 may be used alone on a wheeled craft or device, a presently preferred embodiment includes a system which also incorporates a gravity reacting anti-rollback brake (GRAB) 3 of the type disclosed by the present inventor in co-pending U.S. Ser. No. 10/425,034, filed Apr. 29, 2003 and entitled "Gravity Reacting Anti-Rollback Brake," and which is hereby incorporated by reference in its entirety.

Figure 5A:
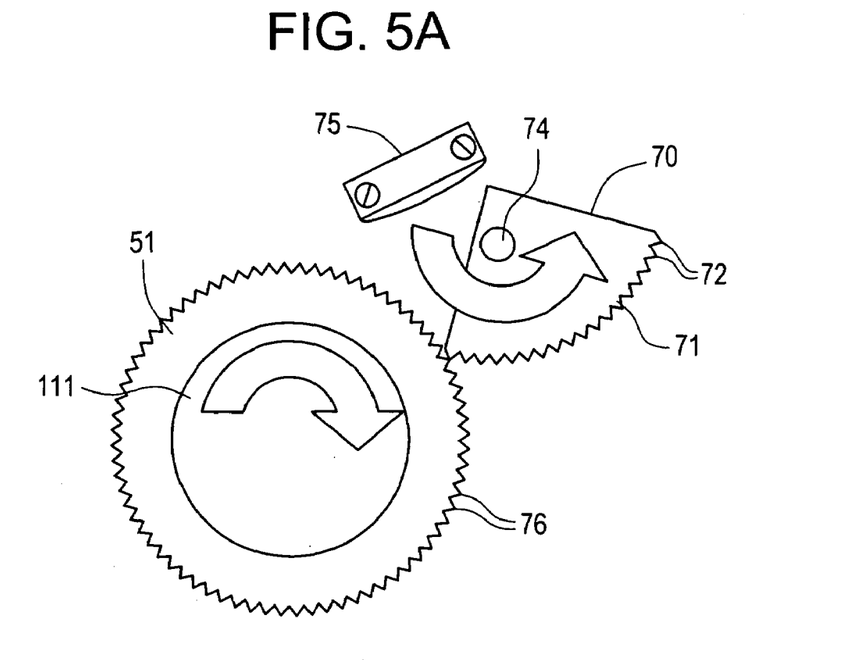
FIG. 5A is a perspective view in isolation of an embodiment of a gravity reacting anti-rollback brake on flat terrain according to the invention.
Figure 5B:
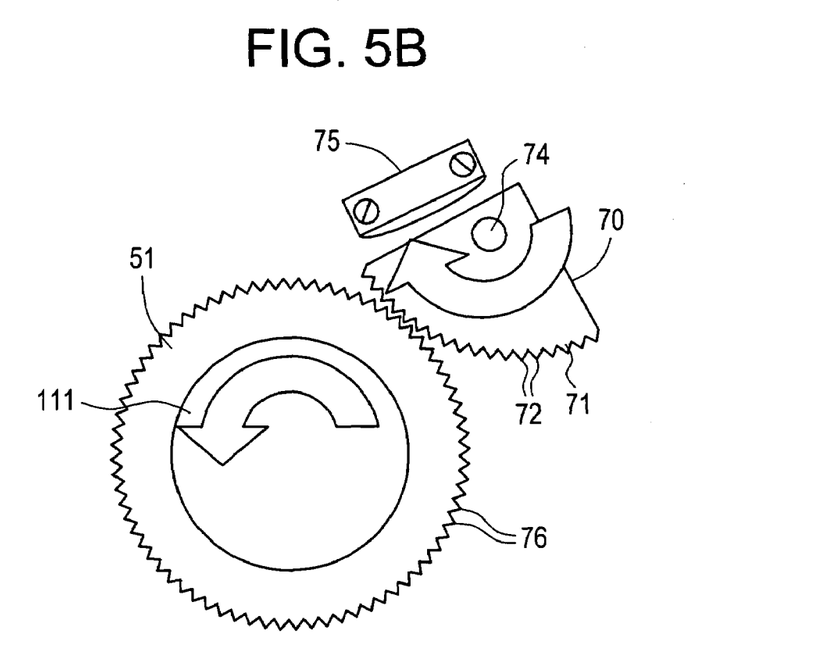
FIG. 5B is a perspective view in isolation of an embodiment of a gravity reacting anti-rollback brake when ascending inclined terrain according to the invention

The GRAB assembly 3 of the present invention preferably associates the graded brake cams with the respective axles of the wheel instead of the hub of the wheel as done in the preferred embodiment set forth in U.S. Ser. No. 10/425,034. This newly preferred configuration is presently believed to provide three advantages; namely, ease of configuring the chair to be folded for storage or transportation; reducing potential decreased performance due to dirt or water on the wheel; and ease of coupling the system with the GRASP system for a combined brake system. However, this new configuration is not mandatory As depicted in FIGS. 5A and 5B, brake cams 70 are graded such that their gripping power is increased as the face 71 of the cam is engaged. Any suitable configuration of brake cams is understood to be within the scope of the invention. For example, it is well within the skill of the ordinary artisan armed with the present specification to adapt a configuration which allows for free movement of the wheels in both directions when on flat terrain and prevents movement in one direction when a predetermined incline is reached.

Presently preferred brake cams comprise a durable material, such as lightweight and strong metal alloy(s). According to the invention, brake pads can be used with brake cams to accommodate a range of wheels and environments. Alternatively, to prevent wear, it is possible to construct brake cams 70 from a strong unitary material, such as metal, and provide the outer cam surface 71 with serrations or teeth 72 for grip (or for interlocking with cooperating teeth or serrations disposed on the axle in a preferred embodiment). Likewise, brake pads may comprise any suitable material. If used, brake pads are preferably interchangeable and thus may be easily replaced when worn.

As shown in FIG. 5A, the cams 70 are configured such that on level surfaces the cam face 71 is not in contact with the wheel or, in this embodiment, the teeth of inner ring 51 of wheel axle 111, thereby allowing freewheeling in a forward and rearward direction. However, as shown in FIG. 5B, the changing of the angle of the wheelchair frame (i.e., via an incline) in relation to the constant, gravity-induced brake-cam position results in a diminishing clearance between the braking surface of cam surface and the axle of the rear wheel. Since the grade of the cam lessens in favor of the intended direction of movement, the cam does not impede movement of the rear wheel in a forward direction. However, the grade of the cam increases in the opposite direction. The cam's movement towards the wheel periphery directly correlates to the wheelchair's rotation around the hub of the main wheels. Once in contact with the wheel, any rearward rotation leads to an increasing grip by the cam as it thickens when rotated about its fulcrum 74. Thus, the cam serves to prevent further rotation of the wheels in that direction. Preferably, a stop 75 is provided to block the cam from over rotation or breaking due to the large stress and weight that may be encountered in operation.

As alluded to above, according to a presently preferred embodiment, the axle or inner ring 51 connected to the axle is provided with teeth 76 or the like for mating with reciprocal interlocking teeth on the cam head. Accordingly, the teeth interlock as the axle rotates to cause stoppage of the rotation in a rearward direction when on incline terrain. Furthermore, stop 75 acts as the final reinforcement to cam to stop any further movement in the rearward direction.

Figure 7:
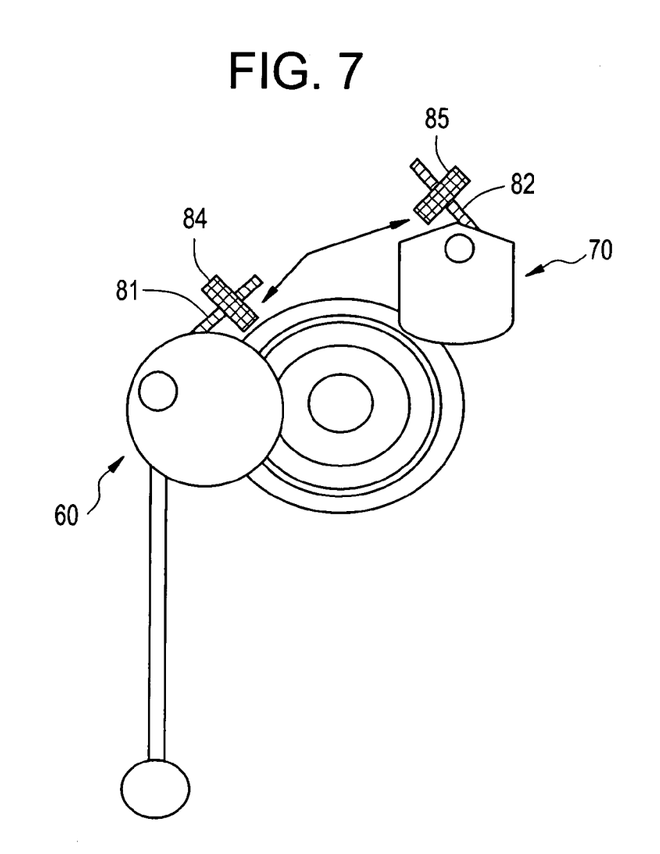
FIG. 7 is a side view of a portion of an embodiment of a brake assembly including variable sensitivity adjusters for adjusting the incline/decline angle at which the brake will engage.

Operatively disposed in connection with brake cams 70 is adjustment mechanism or adjuster 80 (see FIG. 7). As will be appreciated, gravity keeps the weight at a constant 180 degrees from the brake cam fulcrum 74 regardless of the angle of the wheelchair. The adjuster 80 preferably comprises an adjustable weight 81 which may be positioned to influence the slope at which the cams will contact the axles. The adjuster 80 according to this embodiment of the invention has a weight which can be adjusted to cause cams to engage at a specified slope angle or desired sensitivity.

Also according to the invention, the brake system may include a release mechanism for releasing the rollback protection when needed, for example, when having to move back from an outwardly opening automatic door. It is well within the ability of one of ordinary skill in the art to provide a mechanism which moves the cam brakes out of operational position with their respective wheels. Details of one such mechanism can be found in Applicant's previously incorporated co-pending application U.S. Ser. No. 10/425,034.

Likewise, it is well within the ability of one of ordinary skill in the art armed with the present specification and Applicant's previously identified co-pending application to modify the shape, configuration or disposition of the GRAB system and/or its components to achieve the intended purpose.

Figure 6A:
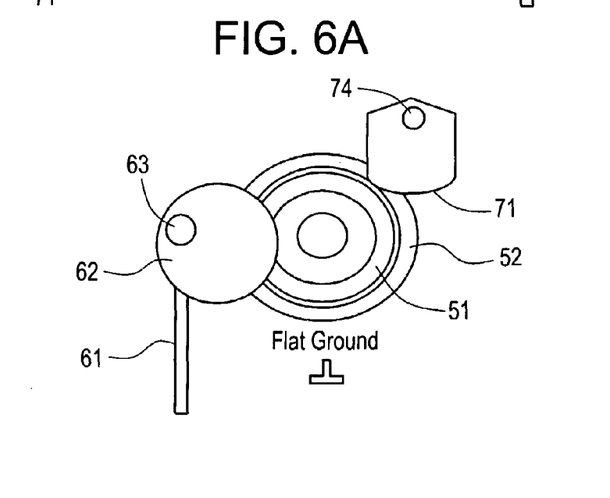
FIG. 6A is a side view of a portion of an embodiment of a brake assembly according to the invention on flat terrain.
Figure 6B:
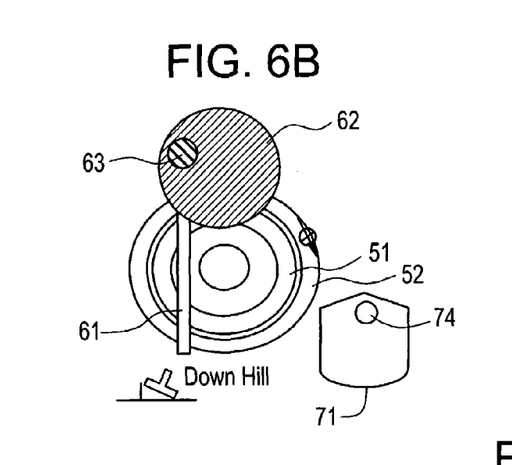
FIG. 6B is a side view of a portion of an embodiment of a brake assembly according to the invention on a downhill slope.
Figure 6C:
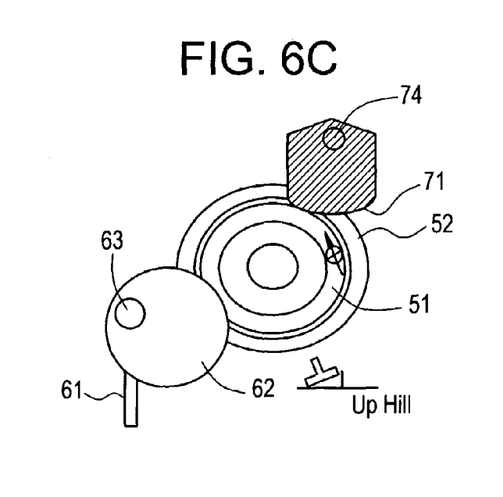
FIG. 6C is a side view of a portion of an embodiment of a brake assembly according to the invention on an uphill slope

FIGS. 6A-C depict a presently preferred embodiment of a brake system which utilizes both a GRASP assembly and a GRAB assembly. Once again, the face 71 of cammed head 70 of the GRAB assembly is preferably configured to comprise teeth or the like (see FIGS. 5A and 5B) that allows the cammed head 71 to interlock with the threads or teeth of the inner ring 51 of the safety bearing 50 of the GRASP assembly. Accordingly, as depicted in FIG. 6A, when on flat ground, both the down-hill activator 60 of the GRASP assembly and the cammed head 70 of the GRAB assembly are gravitationally disposed to allow the inner ring 51 of the safety bearing 50 to reside outside of the outer ring 52. This configuration thus allows the axle in bearing housing to rotate freely in the forward and rearward directions.

However, as depicted in FIG. 6B, once downhill terrain of a sufficient or predetermined grade is encountered, gravity acts as previously described herein to allow the down-hill activator 60 to engage inner ring 51 of the safety bearing 50 and overcome the spring bias to force the inner ring 51 towards the inside and into an interlocked position with the outer ring 52. The outer ring 52 in turn is connected to a respective disc brake. Thus, as the system operates to provide the calipers force to squeeze the disc brake(s), a resultant slowing or stoppage of the outer ring occurs, which in turn provides for a corresponding slowing or stoppage of the rotation of the wheel axle and wheels in the forward direction. Accordingly, use of the system allows for controlled or stopped movement when descending an inclined surface in the forward direction.

By contrast, as depicted in FIG. 6C, when up hill terrain is encountered, if the angle of inclination exceeds the predetermined setting of the GRAB assembly, the face of cammed head 71 mates the axle bearing through interlocking teeth or the like to prevent rearward movement of the wheel as previously described herein.

FIG. 7 depicts a portion of a combination brake having both a GRASP assembly and a GRAB assembly to better illustrate the use of variable sensitivity adjusters according to this aspect of the invention. Variable sensitivity adjusters are preferably provided to allow for the angle of incline/decline at which the respective gravity reactive brake assemblies will engage to be predetermined and adjusted. In this illustrative embodiment, the variable sensitivity adjusters comprise a threaded body 81, 82, such as a bolt, and weights 84, 85, such as nuts, which may be threaded to mate with the threads of the bolt. As will be appreciated, by manipulating the position of counterweights, the angle of incline/decline at which the weight of the activators causes the brakes to engage can be controlled. One of ordinary skill in the art armed with the present specification can devise numerous alternate configurations of counterweights or adjustment mechanisms which affect the angle of incline at which the brake(s) will engage.

Figure 8:
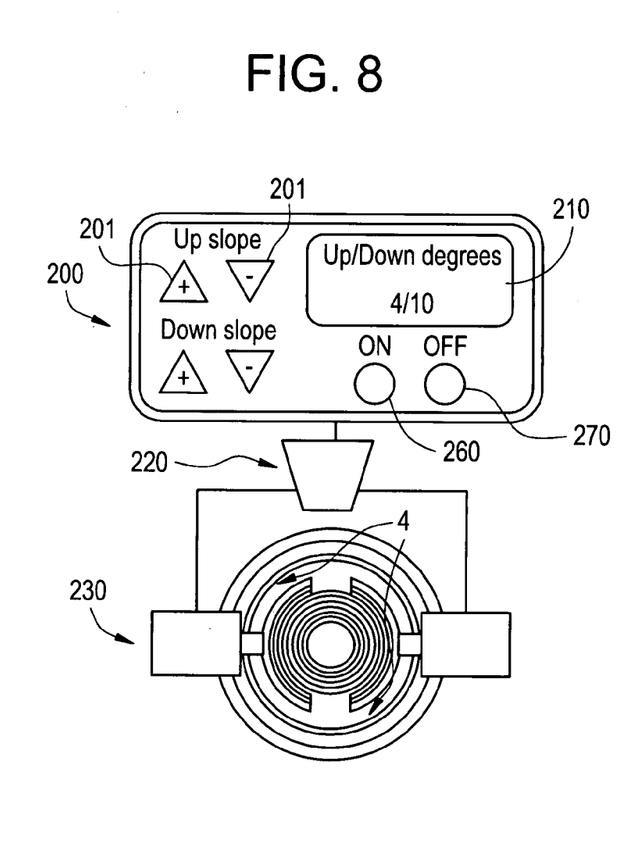
FIG. 8 depicts a control panel, tilt switch, and solenoid assembly for use in an alternative embodiment of the invention for adjusting the braking force of a brake assembly.

FIG. 8 depicts an alternative embodiment of a brake system for use in the present invention. Rather than using mechanical weights and gravity to control the angle at which the brakes will be activated, this embodiment uses a tilt switch (or other device capable of sensing sloped terrain) and solenoid assembly that controls the speed of rotation of a wheeled vessel or manipulates the gears of a brake assembly of the types described above. Although any suitable electrical assembly may be used, in a preferred embodiment there is provided a battery powered tilt switch 220 and a two-solenoid braking assembly 230. In this embodiment, one solenoid locks to prevent rollback on an up slope and the other locks the turning axle on the downhill with the disc braking system. It is also suitable to use a solenoid assembly for one or the other braking systems 2, 3 but maintain use of a mechanical adjuster 81 or 82 for the other.

In the embodiment of FIG. 8, a control panel 200 in communication with a tilt switch 220 is provided. The control panel 200 includes buttons 201 that a user can use to increase or decrease the angle of incline/decline at which the switch 220 will actuate for either controlling gears and/or locking the axle to hinder or prevent movement in an unwanted direction on terrain having a slope equal or greater to the manually (or preset) slope.

The control panel can also include a display 250 to provide the user with information relating to the brake settings. In addition to the settings, the display 250 can include other information that may be of interest to a user of the device. The system can also include an "on" switch 260 and an "off" switch 270 (or a toggle switch that provides both functions). The on/off switching ability could allow a user to turn of the system when automatic braking is not desired or necessary. Numerous permutations of functions can be included in connection with the control or artificial intelligence built into the controller. For example, the control panel can be provided with memory that allows predetermined settings to be saved and stored for use at a later. The explication of every feature that could be included in the operation of an electrical or intelligent switching system are beyond the scope of the present invention. Suffice it to say that one of ordinary skill in the art armed with the present specification can use other types of reliable switches to eliminate the pendulum type activation previously described and/or allow a user to adjust the sensitivity of the braking systems selectively.

Those skilled in the art will appreciate that various adaptations and modifications of the above-described preferred embodiments can be configured without departing from the scope and spirit of the invention. Therefore, it is to be understood that, within the scope of the appended claims, the invention may be practiced other than as specifically described herein.

I claim:

1. A brake system for a wheel comprising:
   a downhill activator having an inner ring and an outer ring and a spring; said inner ring and said outer ring being configured such that the said inner and outer ring are mateable to comprise a cooperatively rotating body; said spring being configured to bias said inner ring and said outer ring in an un-mated position;
   a disc brake integral with said outer ring, whereby the speed of rotation of said disc brake directly affects the speed of rotation of said outer ring;
   a wheel axle integral with said inner ring, whereby the speed of rotation of said wheel axle directly affects the speed of rotation of said inner ring;

a pendulum gravitationally disposed relative to said inner ring such that when a predetermined angle of decline is reached said pendulum overcomes the spring bias of said inner ring to place said inner ring into cooperative movement with said outer ring; whereby braking force applied to said disc brake is applied to said wheel axle.

2. The brake system of claim 1, further comprising:
a selector for preselecting an amount of braking force to be applied by said disc brake.

3. The brake system of claim 2, further comprising a cable for communicating the preselected amount of braking force to said disc brake.

4. The brake system of claim 3, further comprising a pair of calipers associated with said disc brake for pinching said disc brake with frictional braking force.

5. The brake system of claim 3, wherein said selector is a bicycle gear selector.

6. The brake system of claim 1, wherein said pendulum includes a cammed head graded for camming said inner ring inside said outer ring as said angle of decline increases.

7. The brake system of claim 1, wherein said inner and outer rings include interlocking teeth.

8. The brake system of claim 1, further comprising an adjuster for setting said predetermined angle of decline.

9. The brake system of claim 8, wherein said adjuster comprises an adjustable weight.

10. A wheelchair comprising:
a frame assembly;
a seat for supporting a user, said seat being supported by said frame assembly;
a plurality of wheels connected with the frame assembly for rollably supporting the frame assembly; said plurality of wheels including a pair of rear wheels;
a disc brake for each rear wheel;
mateable inner and outer rings disposed on each rear wheel, said outer ring operatively connected to a respective disc brake, said inner ring operatively connected to said wheel and being spring biased away from said outer ring;
a gravitationally disposed body configured to force mate said inner and outer rings when said wheelchair reaches a predetermined angle of decline; whereby when said inner and outer rings are mated a braking force of said disc brake is communicated to said wheel; and
a cam gravitationally disposed adjacent each rear wheel such that said cams contact said wheels when said wheelchair reaches a predetermined angle of incline;
said cams being graded so as to allow rotation of said wheels in a first direction but not in a second direction when in contact with said rear wheels.

11. The wheelchair of claim 10, further comprising means for disengaging said cams from contact with said wheels after reaching or exceeding said predetermined angle of incline.

12. The wheelchair of claim 11, further comprising an adjustable weights for setting said predetermined angle of incline and decline.

* * * * *